(12) United States Patent
Haenen et al.

(10) Patent No.: US 7,457,509 B2
(45) Date of Patent: Nov. 25, 2008

(54) LIGHT-GUIDING DEVICE AND A METHOD OF GUIDING LIGHT

(75) Inventors: Ludovicus Johannes Lambertus Haenen, Eindhoven (NL); Augustinus Gregorius Henricus Meijers, Eindhoven (NL); Edwin P. H. Van Lier, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 127 days.

(21) Appl. No.: 10/598,742

(22) PCT Filed: Mar. 2, 2005

(86) PCT No.: PCT/IB2005/050773

§ 371 (c)(1),
(2), (4) Date: Sep. 11, 2006

(87) PCT Pub. No.: WO2005/091026

PCT Pub. Date: Sep. 29, 2005

(65) Prior Publication Data
US 2007/0183714 A1 Aug. 9, 2007

(30) Foreign Application Priority Data
Mar. 15, 2004 (EP) .................................. 04101055

(51) Int. Cl.
*G02B 6/10* (2006.01)
(52) U.S. Cl. ...................................... 385/146; 385/901
(58) Field of Classification Search ................. 385/146, 385/131, 901
See application file for complete search history.

(56) References Cited

U.S. PATENT DOCUMENTS

| 4,671,606 | A |   | 6/1987  | Yevick           |         |
|-----------|---|---|---------|------------------|---------|
| 4,824,194 | A | * | 4/1989  | Karasawa         | 385/146 |
| 5,173,097 | A |   | 12/1992 | Jansen           |         |
| 5,651,086 | A | * | 7/1997  | Russell          | 385/146 |
| 6,472,915 | B1|   | 10/2002 | Moyal et al.     |         |
| 2001/0033407 | A1 |   | 10/2001 | Cao          |         |
| 2002/0167820 | A1 |   | 11/2002 | Haering et al. |         |
| 2007/0086712 | A1 | * | 4/2007  | Shani         | 385/101 |

FOREIGN PATENT DOCUMENTS

| EP | 0284098 A1    | 9/1988 |
| WO | WO96/13884 A1 | 5/1996 |
| WO | WO0167612 A1  | 9/2001 |
| WO | WO03065586 A2 | 8/2003 |

* cited by examiner

*Primary Examiner*—Hemang Sanghavi (57) ABSTRACT

A light-guiding device having a coupling-in surface (46) for coupling-in light radiation substantially in a first main direction (41) perpendicular to said coupling-in surface (26;46), and having a coupling-out surface (47,48,49) for coupling-out light radiation substantially in a second main direction (42) perpendicular to said coupling-out surface. The coupling-out surface has other dimensions than the coupling-in surface (46). The device comprises a number of plate-like light-guiding members (43,44,45), each having a substantially rectangular lateral coupling-in surface and a substantially rectangular lateral coupling-out surface (47,48,49). A number of the plate-like light-guiding members are stacked together to create the coupling-in surface (46) formed by said lateral coupling-in surfaces abutting each other at their long sides. The coupling-out surface (47,48,49) is created by said lateral coupling-out surfaces abutting each other at their short sides.

20 Claims, 5 Drawing Sheets

LIGHT-GUIDING DEVICE AND A METHOD OF GUIDING LIGHT

The invention relates to a light-guiding device having a coupling-in surface for coupling-in light radiation substantially in a first main direction perpendicular to said coupling-in surface, and having a coupling-out surface for coupling-out light radiation substantially in a second main direction perpendicular to said coupling-out surface, wherein the coupling-out surface has dimensions other than those of the coupling-in surface, and wherein, for example, the light radiation is further guided into a light-emitting element.

The light-emitting element can be placed in front of said coupling-out surface to direct the light radiation into it, but the light-emitting element may alternatively be glued with optical glue against the coupling-out surface of the light-guiding device, or even integrally connected to it; for example, the light-guiding device and the light-emitting element may be molded in one injection-molding operation. In that case the coupling-out surface is only an area, and not an outer surface of material.

The term "main direction" of the light radiation-means that the light is radiated in different directions at comparatively small angles to said main direction, in particular smaller than about 45°, the average direction of the light radiation substantially being the main direction.

Depending on the refractive index of the material of the light-guiding member, light radiation will be reflected back into the material of the light-guiding member by the outer surfaces of that member, provided that the outer surface is smooth and that the angle of incidence is greater than a certain value, i.e. the angle of total reflection. The angle of incidence is the angle between the light beam and a line perpendicular to the surface to which the light beam is directed. Appropriate materials for guiding light are transparent thermoplastics, in particular polymethyl methacrylate (PMMA) or polycarbonate (PC). Such materials can be shaped, for example, by an injection molding process, by an extrusion process, or by a material-removing laser operation.

A light-guiding system comprising an element that emits light into a space to be illuminated is disclosed in US-A-2002/0167820. This publication describes a light-guiding system for improving the lighting conditions of the passenger compartment of a motor vehicle, wherein a plate-like light-emitting element is arranged in the area of the interior lining of the vehicle roof. Light radiation is coupled in into the light-emitting element through a lateral surface of the element, and light is emitted through the large front surface of said element into the passenger compartment of the vehicle in a homogeneous manner.

Light radiation can be coupled in into the light-emitting element by means of a light-generating unit, such as a fluorescent tube, extending along the oblong lateral coupling-in surface of the light-emitting element. As an alternative, a number of light sources, such as light-emitting diodes (LEDs) may be arranged in a row along said lateral coupling-in surface. However, in all these cases, only a portion of the light radiated by the light-generating unit will reach the lateral surface for coupling-in the light radiation into the light-emitting element. A reflector arranged behind the light generating unit can increase the portion of the light radiation that reaches said lateral surface, but still there is much more light generated near said lateral surface than can be coupled in into the light-emitting element.

Furthermore, it is often desired that the directions of the light beams that leave the light-guiding device—and may be coupled in into the light-emitting element—enclose relatively small angles with said second main direction of the light radiation, being the direction perpendicular to the coupling-out surface of the light-guiding device. Smaller angles of the light beams to the second main direction, i.e. a reduced angular distribution of the light radiation in the second main direction, will improve the guidance of the light into the light-emitting element.

The object of the invention is to provide a light-guiding device, whereby light radiation is guided from a relatively small light source and is distributed over a larger area, in particular an oblong coupling-out surface, such that preferably the angles between the light beams and the main direction of the light radiation are made smaller.

In order to accomplish that objective, the light-guiding device comprises a number of plate-like light-guiding members, each having a substantially rectangular lateral coupling-in surface and a substantially rectangular lateral coupling-out surface, wherein a number of the plate-like light-guiding members are stacked together so as to create the coupling-in surface formed by said lateral coupling-in surfaces abutting each other at their long sides, and wherein the coupling-out surface is created by said lateral coupling-out surfaces abutting each other at their short sides. Substantially rectangular means that the shape may be rectangular, but the shape may alternatively be bordered by two long sides and two short sides that are more or less curved in a two-dimensional plane or in a three-dimensional space.

By making use of a number of plate-like light-guiding members, the light radiation can be distributed over a long coupling-out surface, while the coupling-in surface has an appropriate shape for being placed in front of a light source, for example a square shape.

In one preferred embodiment, the coupling-in surface has a substantially rectangular shape wherein the long side is less than five times longer than the short side, and wherein the coupling-out surface has an oblong shape having a length of more than five times, preferably more than ten times, the length of said long side of the coupling-in surface. Preferably, the coupling-in surface has a substantially square shape.

In one preferred embodiment, each of the plate-like light-guiding members is provided with a lateral reflecting outer surface for reflecting the light radiation, which lateral reflecting outer surface is positioned at an angle to said first main direction and directs the light radiation substantially in the second main direction towards the coupling-out surface. Preferably, the angle between said reflecting outer surface and said first main direction is between 15° and 55°, more preferably between 35° and 45°, and in one preferred embodiment about 40°. The second main direction of the light radiation can thus be substantially perpendicular to the first main direction.

The reflecting outer surfaces of the light-guiding members may be flat surfaces, but the distribution of the light radiation, i.e. the distribution of the light intensity, in the coupling-out surface of the light-guiding device can be influenced by means of curved reflecting outer surfaces. The presence of said reflecting outer surfaces in the light-guiding members creates the possibility of a smaller dimension of the light-guiding device in the direction of the light radiation leaving the light-guiding member through the coupling-out surface, i.e. in the second main direction.

In one preferred embodiment, the cross-sectional area—perpendicular to said first main direction—of each plate-like light-guiding member increases in the first main direction. Preferably, the increase of the cross-sectional area starts at the lateral coupling-in surface of each light-guiding member.

The increasing cross-sectional area, in particular created by diverging lateral surfaces bordering the lateral coupling-in surface of each light-guiding member, results in smaller angles between the light beams and the first main direction after the light radiation has passed the relevant portion of the light-guiding member, because the diverging lateral outer surfaces reflect the light beams in a direction having such smaller angles relative to said first main direction. The result is a reduced angular distribution of the light radiation in the main direction. Said diverging lateral outer surfaces may be flat, but they may also have a parabolic or other shape, which shape may further improve the directional effect of the light beams.

The conversion of the cross-section of the light-guiding device—perpendicular to the first and second main directions of the light radiation—is achieved by guiding the light radiation in the device through a number of separate plate-like light-guiding members. The light radiation is thus divided into portions, so that each portion can be guided through a light-guiding member to the desired location. Furthermore, the cross-section in each light-guiding member increases because of the diverging lateral surfaces, so that the coupling-out surface can have an oblong shape. These are important characteristics of the light-guiding device. Less important are the way the light radiation is guided into said light-guiding members and the way they leave the members.

The light radiation can enter the light-guiding members through their lateral coupling-in surfaces, which together form the coupling-in surface of the light-guiding device. In one preferred embodiment, portions of the plate-like light-guiding members make optical contact near the coupling-in surface, and are preferably glued together with optical glue having about the same refractive index as the material of the light-guiding members themselves. So, there are no barriers to the light radiation in the material of the light-guiding device near said coupling-in surface, but further away from said coupling-in surface portions of the light radiation are caught (coupled in) into each of the stacked light-guiding members. The aim of the optical contact, for example the use of optical glue, is to mix the light radiation properly and to create a homogenous light distribution in the entire stack of light-guiding members after the coupling-in surface, so that equal parts of the light radiation enter each of the stacked light-guiding members. Instead of, or additional to, the application of glue, a solid additional light-guiding member may be placed in front of the coupling-in surface of the light-guiding device, or may be glued against the coupling-in surface. The length of such an additional light-guiding member, or the length of the portions of light-guiding members joined by glue may lie between 20 mm and 100 mm, preferably between 35 mm and 70 mm, more preferably about 50 mm.

Near the coupling-out surface of the device, the lateral surfaces of the light-guiding members may be glued together, so that there are no barriers to the light radiation in the material of the device near its coupling-out surface. It is also possible to place an additional solid light-guiding member in front of the coupling-out surface of the light-guiding device, or to glue such an additional member against the coupling-out surface.

In one preferred embodiment, the thickness of the plate-like light-guiding members near the coupling-out surface increases in the second main direction, so that the short side of the coupling-out surface is longer than the thickness of the plate-like light-guiding member further away from the coupling-out surface. The substantially parallel outer surfaces of the plate-like members diverge in said second main direction near said coupling-out surface as a result of this. An effect of the diverging outer surfaces is a further decrease in the deviation of the directions of the light beams from the second main direction, i.e. a narrowed angular distribution of the light radiation.

Preferably, portions of the plate-like light-guiding members near said coupling-in surface extend in different substantially parallel planes, while the portions of the plate-like light-guiding members near said coupling-out surface extend in substantially one plane. Said planes may be flat or curved in order to adapt the shape of the light-guiding device to the shape of the available space to accommodate the device.

The invention furthermore relates to a method of guiding light through a light-guiding device, wherein light radiation is coupled in substantially in a first main direction perpendicular to the coupling-in surface, wherein light radiation is coupled out substantially in a second main direction perpendicular to the coupling-out surface, wherein the coupling-out surface has dimensions other than those of the coupling-in surface, wherein the light radiation is guided by a number of plate-like light-guiding numbers, each having a substantially rectangular lateral coupling-in surface and a substantially rectangular lateral coupling-out surface, wherein a number of the plate-like light-guiding members are stacked together to create the coupling-in surface formed by said lateral coupling-in surfaces abutting each other at their long sides, and wherein the coupling-out surface is created by said lateral coupling-out surfaces abutting each other at their short sides.

The invention will now be further elucidated by means of a description of two embodiments of a light-guiding device, for which reference is made to the drawing comprising Figures which are only schematic representations and in which.

Figure 1:
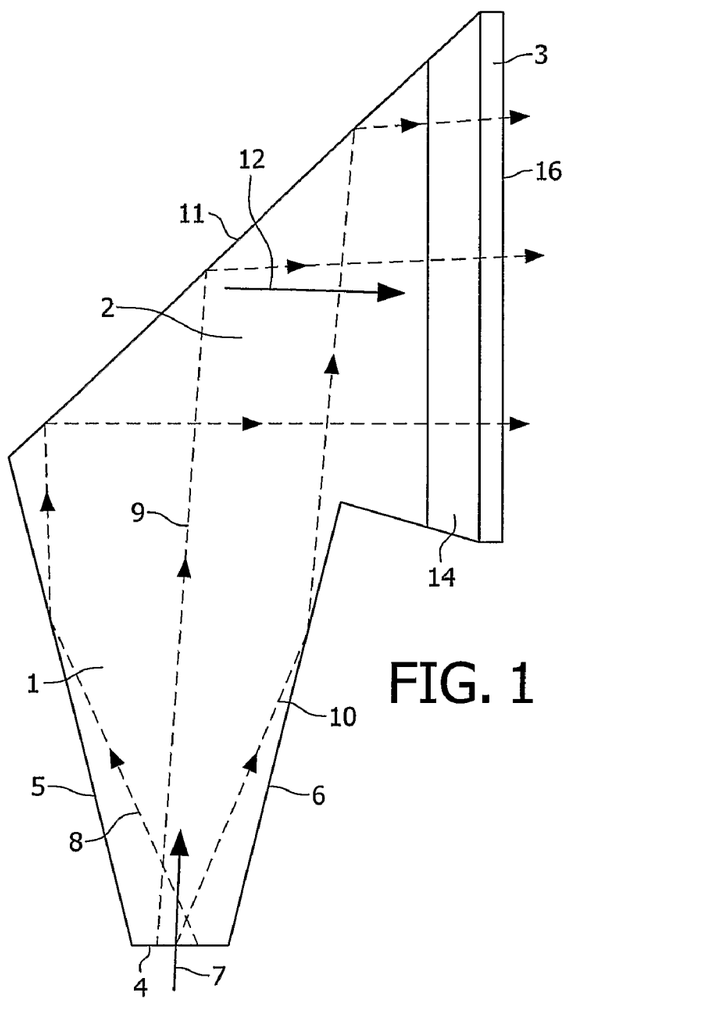
FIG. 1 is a plan view of a light-guiding member.
Figure 2:
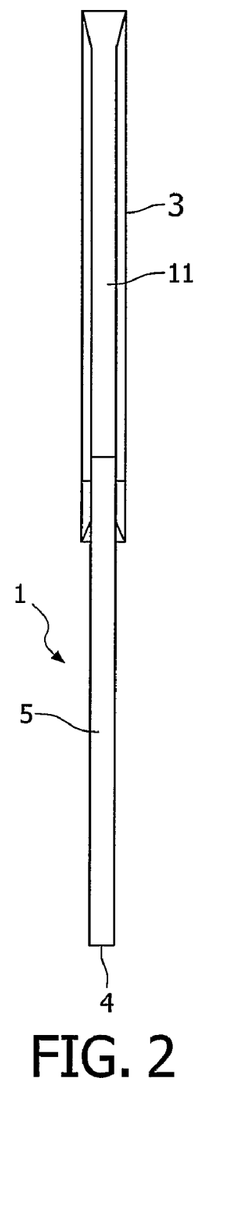
FIGS. 2 and 3 are side views of the light-guiding member shown in FIG. 1.
Figure 3:
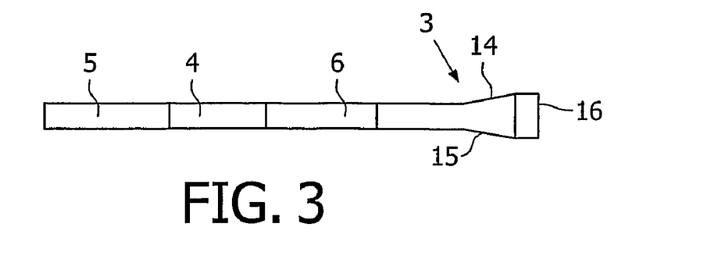
Figures 4, 5:
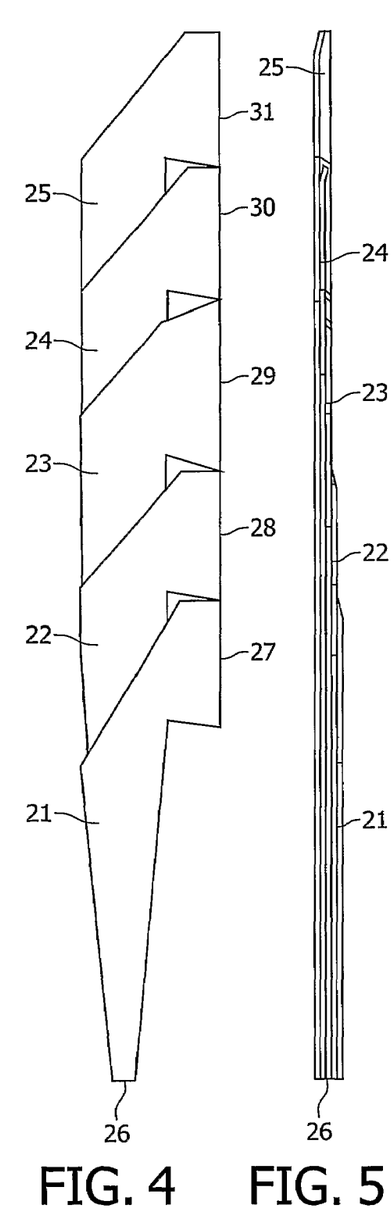
FIGS. 4, 5 and 7 are views of a first embodiment of a light-guiding device.
Figure 6:
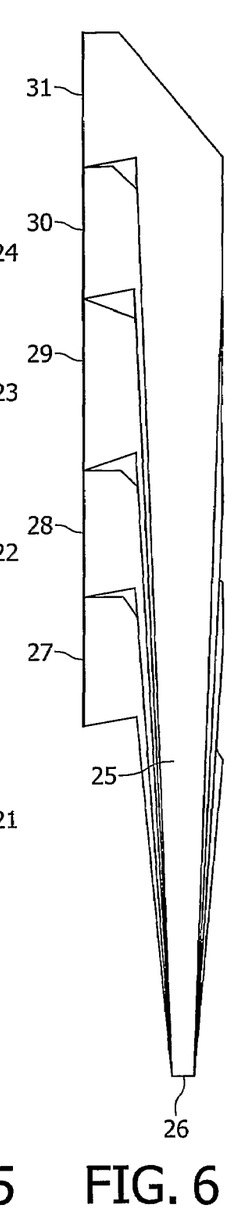
Figure 7:
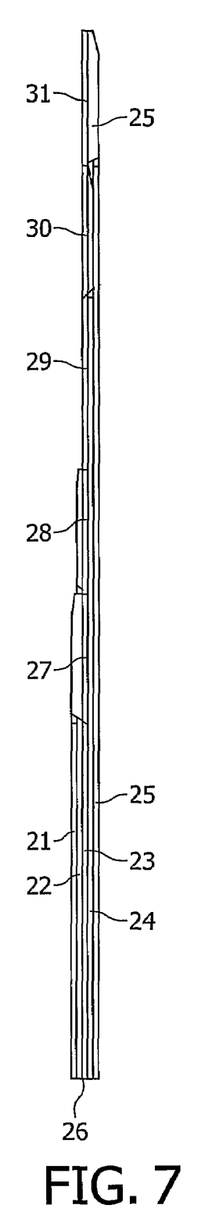

According to the first embodiment, the light-guiding device is composed of five substantially plate-like light-guiding members, and FIGS. 1, 2 and 3 show such a light-guiding member. In this example, the material of the light-guiding member is polycarbonate, which is a transparent thermoplastic material that can be shaped by means of an injection-molding operation. The outer surfaces of the member are smooth, so that light that is coupled in will be reflected by said outer surfaces, provided that the angle of incidence with respect to the relevant outer surface is greater than the angle of total reflection (i.e. the critical angle of total reflection). The angle of total reflection depends on the value of the refractive index of the material of the light-guiding member and the value of the refractive index of the medium bordering the relevant outer surface of the light-guiding member.

The refractive index of polycarbonate is about 1.6 and the refractive index of air is about 1.0, so the angle of total refraction is about 39°. That means that all light beams having an angle of incidence greater than 39° with respect to the relevant outer surface of the light-guiding member will be totally reflected back into the material of the light-guiding member. Only a light beam having an angle of incidence smaller than 39° will not be reflected, but will be coupled out.

The light-guiding member comprises a first part 1, a second part 2, and a third part 3. The light radiation guided by the member is coupled in through the lateral coupling-in surface 4. Therefore, a lamp can be placed in front of lateral coupling-in surface 4. Lateral coupling-in surface 4 borders two lateral outer surfaces 5,6, which lateral outer surfaces 5,6 diverge in the first main direction (arrow 7) of the coupled-in light radiation. The light coupled in through lateral outer surface 4 radiates in different directions that encloses relatively small angles with said first main direction 7, in particular smaller than about 45°, such that the average direction is substantially the first main direction 7.

In FIG. 1, three light beams are represented by broken lines 8,9,10, which light beams are coupled in through lateral coupling-in surface 4. Light beam 8 is reflected by lateral outer surface 5, light beam 10 is reflected by lateral outer surface 6, and light beam 9 is directed at a smaller angle to the main direction 7, so that light beam 7 does not hit one of the lateral outer surfaces 5,6. It will be clear that the coupled-in light radiation having a greater angle relative to the first main direction 7 is reflected by the lateral outer surfaces 5,6, the angle to the first main direction 7 decreasing after reflection, so that the diverging part 1 of the light-guiding member narrows the angular distribution of the light radiation around the first main direction 7.

The second part 2 of the light-guiding member has a lateral reflecting outer surface 11 that is positioned at an angle of about 45° to the first main direction 7. Therefore, most of the coupled-in light radiation coming from the first part 1 will be reflected towards the third part 3 of the light-guiding member. The second main direction, i.e. the average direction of the light radiation reflected by reflecting outer surface 11, is indicated with arrow 12, and is directed at an angle of about 90° to the first main direction 7.

The third part 3 of the light-guiding member comprises a portion where the thickness of the plate-like material increases, seen in the second main direction 12. Light radiation reflecting against the diverging outer surfaces 14,15 of the third part 3 encloses a smaller angle with the second main direction 12 after the reflection, so that the diverging surfaces 14,15 narrow the angular distribution of the light radiation around the second main direction 12. The reduction of the angular distribution of the light radiation is similar to the reduction in the first part 1 of the light-guiding member.

The light radiation guided by the light-guiding member is coupled out through lateral coupling-out surface 16 having a much larger surface area than the surface area of the lateral coupling-in surface 4, and furthermore the angular distribution of the light radiation is reduced. The light-guiding member thus provides an appropriate distribution of the light intensity over the lateral coupling-out surface 16. Depending on the requirements, the outer surfaces of the light-guiding member, in particular the outer surfaces 5, 6 and 11, may be curved instead of flat so as to adapt the distribution of the light intensity to the requirements.

Lateral coupling-out surface 16 may be placed against or near the lateral surface of a plate-like light-emitting element in order to couple in the light radiation from the light-guiding member into the light-emitting element. In another embodiment, the light-emitting element, or another element into which the light has to be coupled in, may be connected to the third part 3 by means of optical glue or may be formed as one integral part, for example produced in one injection-molding operation.

Lateral coupling-out surface 16 may be flat or may be provided with a certain profile in order to improve the distribution of the outgoing light radiation. For example, lateral coupling-out surface 16 may be provided with cylindrical lenses, the axes of the cylinders being perpendicular to the plane of the plate-like light-guiding member.

The dimensions of the light-guiding member may be as follows. The thickness of the plate-like member may be between 1 mm and 5 mm, and is preferably about 3 mm. Said diverging outer surfaces 14,15 may diverge to a thickness of 0.5 mm to 3 mm more, preferably 1 mm to 2 mm more than the thickness of the second part 2 of the light-guiding member.

FIGS. 4, 5, 6 and 7 are views of a first embodiment of a light-guiding device comprising five stacked light-guiding members 21,22,23,24,25 of the kind as represented in the FIGS. 1-3. The five light-guiding members 21,22,23,24,25 extend in mutually parallel planes and are stacked together such that the lateral coupling-in surfaces of the five members 21,22,23,24,25 together form one flat and substantially square coupling-in surface 26. The total lengths of the five light-guiding members are different, so that the five lateral coupling-out surfaces 27,28,29,30,31 together can form one elongate coupling-out surface. The part of each member 21,22,24,25 near the respective lateral coupling-out surface 27,28,30,31 is bent out of the respective plane of the remainder of the relevant member 21,22,24,25, except for member 23, so that the lateral coupling-out surfaces 27,28,30,31 are located in line with the lateral coupling-out surface 29 of light-guiding member 23 in the middle of the stack of light-guiding members.

Figure 8:
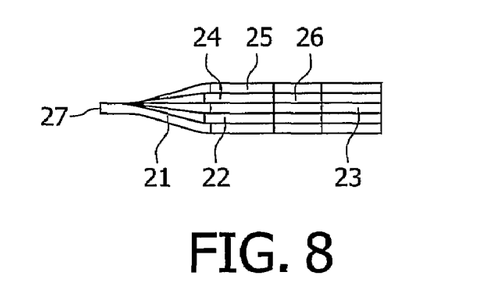
FIG. 8 is a view of the light-guiding device shown in FIGS. 4-7.
Figure 9:
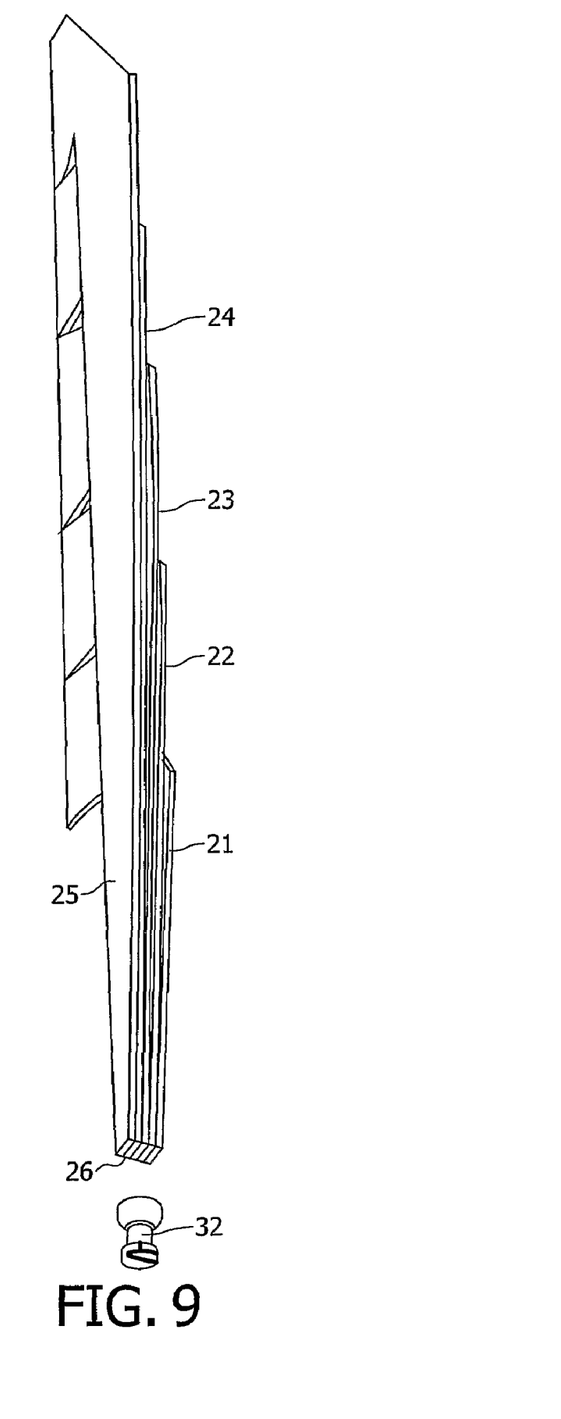
FIG. 9 is a perspective view of the light-guiding device shown in FIGS. 4-8.

FIG. 8 shows, on a larger scale than FIGS. 4-7, the light-guiding device from the side where the light radiation is coupled in, i.e. the side where coupling-in surface 26 is located. FIG. 9 is a perspective view of the light-guiding device with a lamp 32, which emits light radiation towards the coupling-in surface 26 of the light-guiding device.

The Figures show that the substantially square coupling-in surface 26 is built up from the five lateral coupling-in surfaces of the light-guiding members 21,22,23,24,25. The five stacked light-guiding members 21,22,23,24,25 may at least partly be glued together with optical glue, so that light radiation can pass adjacent surfaces of the stacked together members. The members can be glued together in particular in the area near the coupling-in surface 26, so that they form one body in the optical sense. The distribution of the light radiation over the light-guiding members 21,22,23,24,25 can be improved thereby.

Figure 10:
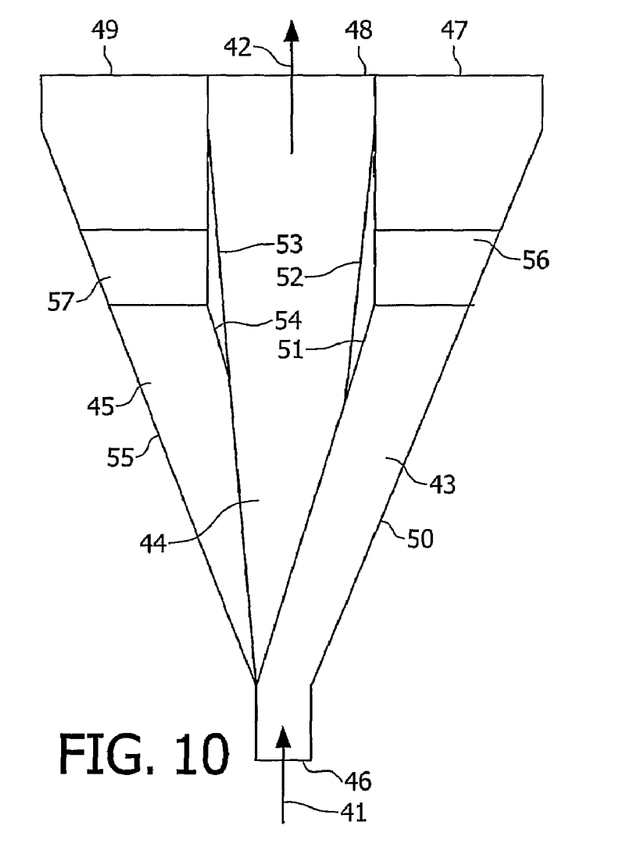
FIGS. 10, 11, 12 and 13 are views of a second embodiment of a light-guiding device.
Figure 11:
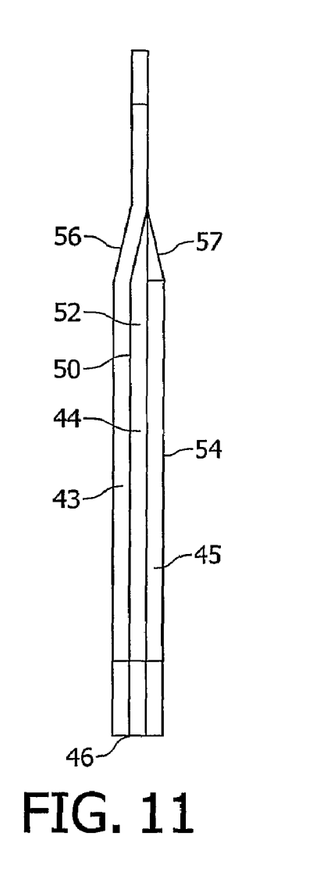
Figure 12:
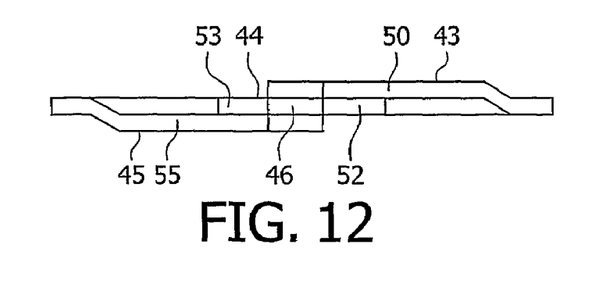
Figure 13:
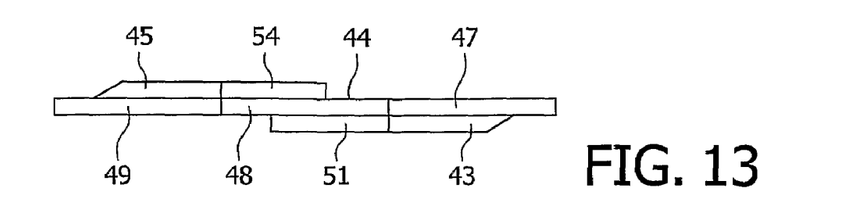
Figure 14:
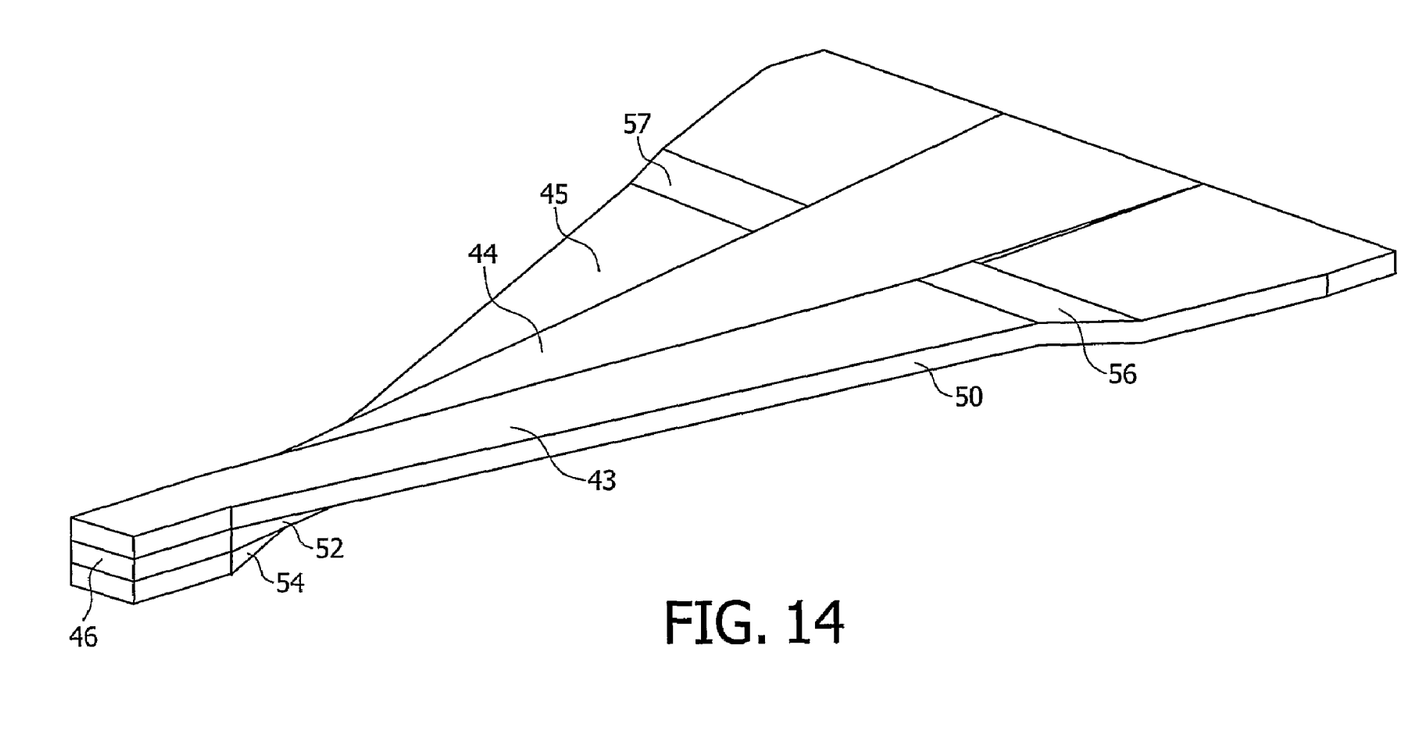
FIG. 14 is a perspective view of the second embodiment.

FIGS. 10-14 show a second embodiment of a light-guiding device, where the first main direction (arrow 41), i.e. the average direction of the coupled-in light radiation, is substantially parallel to the second main direction (arrow 42), i.e. the average direction of the coupled-out light radiation. FIG. 10 is a front view perpendicular to the planes of the three plate-like light-guiding members 43,44,45. FIG. 11 is a view of the device from the right-hand side of FIG. 10. FIG. 12 is a view of the device from the lower side of FIG. 10, showing the coupling-in surface 46, and FIG. 13 is a view of the device from the upper side of FIG. 10, showing the three lateral coupling-out surfaces 47,48,49 of the three plate-like light-guiding members 43,44,45 respectively, which three lateral coupling-out surfaces 47,47,49 together form the oblong coupling-out surface of the device. FIG. 14 is a perspective view of the second embodiment of a light-guiding device.

The second embodiment has a coupling-in surface 46 which is formed by the mutually abutting lateral coupling-in surfaces of the three plate-like light-guiding members 43,44, 45. The coupling-in surface 46 is substantially square, because the three rectangular lateral coupling-in surfaces of the light-guiding members 43,44,45 abut each other at their long sides. A lamp can be placed in front of the coupling-in surface 46 to couple in light radiation substantially in the first main direction 41.

The portion of the device bordering the coupling-in surface 46 has a rectangular cross-section—perpendicular to the first main direction 41—and the three light-guiding members 43,44,45 are glued together with optical glue in that area, so that light radiation can pass the adjacent outer surfaces of the light-guiding members 43,44,45. At some distance from the coupling-in surface 46, where the three light-guiding members do not completely overlap each other anymore (see FIG. 10), the three light-guiding members are optically separated from each other, so that each of the three light-guiding members guides about one third of the total coupled-in light radiation towards the respective lateral coupling-out surfaces 47,48,49.

Each of the three light-guiding members 43,44,45 has diverging lateral outer surfaces 50,51, 52,53, and 54,55, respectively, resulting in a narrowing of the angular distribution of the light radiation during the guidance of the light through the light-guiding members 43,44,45, as explained above.

Near the coupling-in surface 46, the three plate-like light-guiding members 43,44,45 are positioned in three mutually parallel planes, but near the coupling-out surface 47,48,49 all three light-guiding members 43,44,45 are positioned in the same plane, being the centrally located plane of light-guiding member 44. Therefore, light-guiding member 43 has an inclined part 56 and light-guiding member 45 has an inclined part 57, both parts 56,57 enclosing an angle with the parallel planes of the light-guiding members 43,44,45.

The parts of the light-guiding members 43,44,45 near the coupling-out surface 47,48,49 are glued together at their lateral surfaces, which lateral surfaces are parallel to each other in that area. The coupling-out surface of the device is formed by the three rectangular lateral coupling-out surfaces 47,48, 49, which abut each other at their short sides, so that an oblong coupling-out surface is obtained.

The outer surfaces of the light-guiding device and/or the outer surfaces of the individual light-guiding members, or portions of said surfaces, may be provided with a cladding, i.e. a coating having a low refractive index, lower than that of the material of the light-guiding member itself. Such a cladding ensures the internal reflection of the outer surfaces, in particular when that surface is in contact with another object.

The embodiments of the light-guiding member and the light-guiding device as described above are only examples; a great many other embodiments are possible.

The invention claimed is:

1. A light-guiding device having a coupling-in surface for coupling-in light radiation substantially in a first main direction perpendicular to said coupling-in surface, and having a coupling-out surface for coupling-out light radiation substantially in a second main direction perpendicular to said coupling-out surface, wherein the coupling-out surface has dimensions other than those of the coupling-in surface, characterized in that the device comprises a number of light-guiding members, each light-guiding member being configured in the form of a substantially planar plate and having (i) a substantial rectangular lateral coupling-in surface, (ii) two lateral outer surfaces bordering the rectangular lateral coupling-in surface configured to narrow an angular distribution of light radiation around the first main direction, and (iii) a substantially rectangular lateral coupling-out surface, wherein a number of the light-guiding members are stacked together so as to create the coupling-in surface formed by said lateral coupling-in surfaces abutting each other at their long sides, and wherein the coupling-out surface is created by said lateral coupling-out surfaces abutting each other at their short sides.

2. A light-guiding device as claimed in claim 1, characterized in that the coupling-in surface has a substantially rectangular shape whose long side is less than five times longer than the short side, and the coupling-out surface has an oblong shape having a length of more than five times the length of said long side.

3. A light-guiding device as claimed in claim 2, characterized in that each of the plate-like light-guiding members is provided with a lateral reflecting outer surface intermediate the coupling-in surface and the coupling-out surface for reflecting the light radiation, wherein the lateral reflecting outer surface is positioned at an angle to said first main direction and wherein the reflecting outer surface directs the light radiation substantially in the second main direction towards the coupling-out surface.

4. A light-guiding device as claimed in claim 3, characterized in that the cross-sectional area perpendicular to said first main direction of each light-guiding member increases in the first main direction, wherein the two lateral outer surfaces bordering the rectangular lateral coupling-in surface of a respective light-guiding member comprise diverging lateral outer surfaces that create the increasing cross-sectional area.

5. A light-guiding device as claimed in claim 4, characterized in that the increase in the cross-sectional area for each light-guiding member starts at the lateral coupling-in surface of the respective light-guiding member.

6. A light-guiding device as claimed in claim 4, characterized in that portions of the light-guiding members are glued together with optical glue near the coupling-in surface of respective ones of the light-guiding members and are in optical contact with one another.

7. A light-guiding device as claimed in claim 4, characterized in that the thickness of the light-guiding members near the corresponding coupling-out surface of a respective light-guiding member increases in the second main direction from a first thickness to a second thickness greater than the first thickness, wherein the short side of the coupling-out surface has a thickness that is greater than a thickness of the corresponding light-guiding member further from the coupling-out surface.

8. A light-guiding device as claimed in claim 4, characterized in that the portions of the light-guiding members near said coupling-in surface extend in different, substantially parallel planes, while the portions of the light-guiding members near said coupling-out surface extend in substantially the same plane.

9. A light-guiding device as claimed in claim 1, characterized in that each of the plate-like light-guiding members is provided with a lateral reflecting outer surface intermediate the coupling-in surface and the coupling-out surface for reflecting the light radiation, wherein the lateral reflecting outer surface is positioned at an angle to said first main direction and wherein the reflecting outer surface directs the light radiation substantially in the second main direction towards the coupling-out surface.

10. A light-guiding device as claimed claim 9, characterized in that the angle between said reflecting outer surface and said first main direction is between 15° and 55°.

11. A light-guiding device as claimed claim 10, characterized further in that the angle between said reflecting outer surface and said first main direction is between 35° and 45°.

12. A light-guiding device as claimed claim 11, characterized further in that the angle between said reflecting outer surface and said first main direction is about 40°.

13. A light-guiding device as claimed in claim 1, characterized in that the cross-sectional area perpendicular to said first main direction of each light-guiding member increases in the first main direction, wherein the two lateral outer surfaces bordering the rectangular lateral coupling-in surface of a respective light-guiding member comprise diverging lateral outer surfaces that create the increasing cross-sectional area.

14. A light-guiding device as claimed in claim 13, characterized in that the increase in the cross-sectional area for each light-guiding member starts at the lateral coupling-in surface of the respective light-guiding member.

15. A light-guiding device as claimed in claim 1, characterized in that portions of the light-guiding members are glued together with optical glue near the coupling-in surface of respective ones of the light-guiding members and are in optical contact with one another.

16. A light-guiding device as claimed in claim 1, characterized in that the thickness of the light-guiding members near the corresponding coupling-out surface of a respective light-guiding member increases in the second main direction from a first thickness to a second thickness greater than the first thickness, wherein the short side of the coupling-out surface has a thickness that is greater than a thickness of the corresponding light-guiding member further from the coupling-out surface.

17. A light-guiding device as claimed in claim 1, characterized in that the portions of the light-guiding members near said coupling-in surface extend in different, substantially parallel planes, while the portions of the light-guiding members near said coupling-out surface extend in substantially the same plane.

18. A light-guiding device as claimed in claim 1, characterized in that the coupling-in surface has a substantially rectangular shape whose long side is less than five times longer than the short side, and the coupling-out surface has an oblong shape having a length of more than ten times the length of said long side.

19. A light-guiding device as claimed in claim 1, characterized in that the cross-sectional area perpendicular to said first main direction of each light-guiding member increases in the first main direction, wherein the two lateral outer surfaces bordering the rectangular lateral coupling-in surface of a respective light-guiding member comprise diverging lateral outer surfaces that create the increasing cross-sectional area, and characterized in that the portions of the light-guiding members near said coupling-in surface extend in different, substantially parallel planes, while the portions of the light-guiding members near said coupling-out surface extend in substantially the same plane.

20. A method of guiding light through a light-guiding device wherein light radiation is coupled in substantially in a first main direction perpendicular to the coupling-in surface, wherein light radiation is coupled out substantially in a second main direction perpendicular to the coupling-out surface, which coupling-out surface has dimensions other than those of the coupling-in surface, characterized in that the light radiation is guided by a number of light-guiding members, each light-guiding member being configured in the form of a substantially planar plate and having (i) a substantially rectangular lateral coupling-in surface, (ii) two lateral outer surfaces bordering the rectangular lateral coupling-in surface configured to narrow an angular distribution of light radiation around the first main direction, and (iii) a substantially rectangular lateral coupling-out surface, wherein a number of the light-guiding members are stacked together so as to create the coupling-in surface formed by said lateral coupling-in surfaces abutting each other at their long sides, and wherein the coupling-out surface is created by said lateral coupling-out surfaces abutting each other at their short sides.

* * * * *